Patented June 27, 1950

2,512,720

UNITED STATES PATENT OFFICE 2,512,720

DRY RESIN AND PROCESS FOR PREPARING THE SAME

Gerald I. Keim, Lincoln University, Pa., assignor to Hercules Powder Company, Wilmington, Del., a corporation of Delaware No Drawing. Application November 1, 1947, Serial No. 783,611

2 Claims. (Cl. 260—70)

This invention relates in general to the preparation of a dry material for the treatment of paper and, in particular, to a dry sulfanilic acid-modified urea-formaldehyde resin.

In a copending application, Serial No. 717,076, there is disclosed the preparation of a paper having an increased wet strength through the incorporation therein of a sulfanilic acid-modified urea-formaldehyde resin. According to the invention set forth in that copending application, a sulfanilic acid-modified urea-formaldehyde resin is prepared and the reaction of the ingredients is allowed to continue until the product is in the form of an aqueous sirup. The thus-produced aqueous sirup is readily adapted to use in conventional papermaking operations in that it may be added to the paper beater and the resin precipitated on the fibers by means of the chemicals and procedures normally used in the manufacture of paper.

Now, in accordance with the present invention, there is prepared a dry-wet strength agent for paper treatment through the preparation of a sulfanilic acid-modified urea-formaldehyde and its drying according to a procedure which is set forth hereinafter. The aqueous resin solution which results from the interreaction of the various ingredients is dried by causing the solution to be sprayed into an atmosphere of drying air under controlled conditions of temperature and humidity, whereby the moisture is volatilized without exposing the resin to conditions of temperature and the like which would cause an undue change in the physical and chemical properties thereof, such as, for example, curing of the resin. The product produced according to this procedure is a fine, dry powder which is capable of substantially complete re-solution in aqueous medium to form an aqueous solution of the resin which may conveniently be added to a paper stock, for example, by addition to the beater or the like.

It is known, of course, that dried materials have previously been prepared by procedures involving subdivision of the aqueous solutions into minute particles and contacting the particles with a drying atmosphere. In fact, such procedures have even been used on synthetic resin types of materials. However, the use of this type of drying procedure on a synthetic resin material has heretofore been employed in the preparation of a dry powder which is subsequently to be used for molding operations or for some other similar purpose. The use of such a procedure has not previously been employed for the preparation of a dry resin product which may be redissolved in aqueous medium and added to a paper pulp in the course of paper manufacture.

The general nature and scope of the invention having been set forth hereinbefore, the following examples are now presented in illustration, but not in limitation, of the invention:

*Example*

A sulfanilic acid-modified urea-formaldehyde resin was prepared by mixing 90 parts of urea, 260 parts of aqueous 37% formaldehyde, and 10 parts of sulfanilic acid and adjusting the pH to 7.0 with sodium hydroxide. The mixture was heated to reflux for thirty minutes and the pH was reduced to about 4.0 by the repeated addition of small quantities of formic acid during the heating period. At the end of the thirty-minute heating period, the product had a viscosity of about D (Gardner scale) and was then allowed to cool at room temperature and held at room temperature until the viscosity reached about N (Gardner scale). At this point, the reaction was halted by the addition of sodium hydroxide to bring the mixture to a pH of about 8.0.

The aqueous dispersion thus produced was adjusted to a solids content of 17.8% by the addition of water and was then sprayed in a conventional spray drier at an average rate of about 18 lb. per hour. The air inlet temperature was maintained at about 365° F. while the outlet temperature was about 180°–185° F. and the S. T. P. volume was about 195 c. f. m. The dried product was separated and cooled in a cold air stream, whereupon a white, free-flowing powder was collected. The dried powder contained about 5.9% moisture and was readily and substantially completely soluble in water.

In order to determine the efficiency as a wet-strength beater additive, there were prepared three types of paper sheets: The first containing no resin; the second containing 5% resin (solids basis) using the aqueous dispersion obtained directly from the polymerization reaction and prior to the drying procedure; and the third paper containing the same amount of the dried resin. The papers were tested for wet and dry tensile strengths, both in an uncured state and after being cured for one hour at 105° C. The results of the test are set forth in the table and clearly indicate that substantial wet strength is added to the paper through the use of the sulfanilic acid-modified urea-formaldehyde resin and that this increased wet strength imparted by the dried resin is comparable with the increased wet strength imparted by the undried product.

Table

| Handsheets Containing— | Basis Wt., Lb./Ream | Uncured | | Cured One Hour at 105° C. | |
|---|---|---|---|---|---|
| | | Wet Tensile | Dry Tensile | Wet Tensile | Dry Tensile |
| No resin | 39.5 | 2.3 | 19.3 | 3.0 | 20.8 |
| 5% Resin as the Sirup | 39.1 | 6.2 | 23.3 | 8.2 | 24.1 |
| 5% Resin as Dried Powder | 39.3 | 6.3 | 21.4 | 7.8 | 23.2 |

The sulfanilic acid-modified urea-formaldehyde resin used according to the present invention may be prepared in a variety of ways. For example, the three ingredients, urea, formaldehyde, and sulfanilic acid, may be mixed together and reacted as in the foregoing example, or the urea and formaldehyde may be partially polymerized in an alkaline solution, the sulfanilic acid added, and the polymerization continued at an acid pH. In either case, the polymerization is stopped at the desired viscosity by the addition of alkali, and the resulting clear, viscous liquid is adjusted to the desired viscosity and solids content for drying.

The solids content and viscosity of the solution to be dried will, of course, depend on the nature and type of drying equipment which is to be used. In general, however, it has been found satisfactory to adjust the solids content of the resin solution to between about 10 and about 40%, preferably between about 15 and about 20%. Similarly, the drying conditions, such as, for example, temperature and the like, will vary according to the type of equipment used and the specific proportions of ingredients used in the preparation of the resin. In general, however, high temperatures in the drying operation are avoided and, accordingly, the air inlet temperature is maintained at not over about 400° F. and, preferably, between about 350° and about 375° F. The outlet temperature is maintained below about 200° F. and, preferably, about 180° F. so that the resin particles themselves are never unduly heated.

The proportions of the ingredients used in the preparation of sulfanilic acid-modified urea-formaldehyde resins may be varied within relatively wide limits. For example, there may be used between about 5 and about 25 parts sulfanilic acid per 100 parts of urea, preferably, between about 10 and about 15 parts. Likewise, the proportions of formaldehyde may be varied from between about 1.7 and about 4.0 moles formaldehyde per mole of urea, preferably, about 2 moles of formaldehyde to 1 mole of urea.

The urea in the sulfanilic acid-modified resins may be substituted in part or wholly by such materials as melamine, thiourea, guanidine, aminoguanidine, diamines, etc. The formaldehyde may also be wholly or partially replaced by hexamethylenetetramine, acetaldehyde, glyoxal, etc., the sulfanilic acid-modified resins resulting from these substitutions being equivalent in their wet-strengthening properties to the resin prepared from urea and formaldehyde and sulfanilic acid. The sulfanilic acid may be used as the acid, the alkali, or ammonium salt of the acid, or as a mixture of the free acid and one of its salts.

The dried product prepared according to this invention is prepared for use in a papermaking operation by its re-solution in an aqueous medium. Thus, for example, the dried material may be mixed with water to prepare an aqueous solution containing about 1 to about 10% of the resin, and the thus-dissolved product may be added to the paper beater or, alternatively, may be added to the paper stock at any point on the wet end of the paper machine. Thus, besides addition of the resin to the beater engine, there may be employed the addition of the resin to the jordans, headbox, or other similar stage in the paper manufacture. The aqueous solution of the resin is characterized by being clear when the resin is prepared and dried under optimum conditions and by being faintly cloudy when the drying temperature rises somewhat too high. In either case, however, the re-solution of the resin is substantially complete.

As an alternative procedure where the resin is to be added to the paper stock at a point where adequate mixing will be obtained, it is likewise possible to add the resin to the paper stock in its dry powder form without presolution or dispersion. For example, a convenient amount of the dried resin may be added directly to the paper beater, wherein its dispersion in aqueous medium and its incorporation into the paper pulp are brought about automatically.

In addition to yielding a treated paper which is comparable in characteristics with the product prepared from the undried resin, the dried resin prepared in accordance with this invention has numerous advantages. Thus, for example, the liquid or undried resin is generally characterized by being somewhat unstable and having a useful life roughly between three and about six months, depending, of course, on the conditions and nature of the storage. The aqueous resin solutions almost invariably contain a certain proportion of free formaldehyde which makes them quite corrosive to ordinary metals, thus necessitating the construction of special corrosion-resistant containers for shipping and storage. The new dried resin, on the contrary, is substantially stable under conditions of storage for periods as long as one to two years, especially when sealed in moistureproof containers and even when sealed in ordinary paper bags and has a useful life well in excess of the useful life of the resin solutions. Even after prolonged storage, the resin is readily and substantially completely soluble in water.

This application is a continuation-in-part of the copending application, Serial No. 717,076, filed December 18, 1946, and entitled "High Wet-Strength Paper."

What I claim and desire to protect by Letters Patent is:

1. A dry sulfanilic acid-modified urea-formaldehyde resin prepared from between about 5 and about 25 parts sulfanilic acid per 100 parts of urea and between about 1.7 and about 4.0 moles formaldehyde per mole of urea and capable of being substantially completely redissolved in water, said dry resin being prepared by rapidly drying an aqueous solution of between about 15% and about 20% of the resin in the form of a finely-divided mist at a temperature between about 350° and about 375° F.

2. A process of preparing a dry water-soluble resin comprising preparing an aqueous solution containing between about 15 and about 20% total solids of a sulfanilic acid-modified urea-formaldehyde resin of between about 5 and about 25 parts sulfanilic acid per 100 parts of urea and between about 1.7 and about 4.0 moles formaldehyde per mole of urea and spraying the aqueous solution of the resin into an atmosphere of drying air maintained at a temperature between about 350° and about 375° F.

GERALD I. KEIM.

REFERENCES CITED

The following references are of record in the file of this patent:

UNITED STATES PATENTS

| Number | Name | Date |
|---|---|---|
| 1,935,411 | Pollak et al. | Nov. 14, 1933 |
| 2,056,455 | Howald | Oct. 6, 1936 |
| 2,413,624 | Harris | Dec. 31, 1946 |

FOREIGN PATENTS

| Number | Country | Date |
|---|---|---|
| 654,714 | Germany | Dec. 28, 1937 |